(12) United States Patent
Hwang et al.

(10) Patent No.: US 7,259,517 B2
(45) Date of Patent: Aug. 21, 2007

(54) FLAT FLUORESCENT LAMP AND LIQUID CRYSTAL DISPLAY DEVICE HAVING THE SAME

(75) Inventors: In-Sun Hwang, Suwon-si (KR); Hyeon-Yong Jang, Osan-si (KR)

(73) Assignee: Samsung Electronics Co., Ltd. (KR)

( * ) Notice: Subject to any disclaimer, the term of this patent is extended or adjusted under 35 U.S.C. 154(b) by 219 days.

(21) Appl. No.: 11/178,516

(22) Filed: Jul. 11, 2005

(65) Prior Publication Data
US 2006/0012276 A1    Jan. 19, 2006

(30) Foreign Application Priority Data
Jul. 13, 2004    (KR) ..................... 10-2004-0054465

(51) Int. Cl.
*H01J 17/44*    (2006.01)
(52) U.S. Cl. ..................... 313/594; 313/493; 313/634
(58) Field of Classification Search ............... 313/493, 313/594, 634
See application file for complete search history.

(56) References Cited

U.S. PATENT DOCUMENTS

2002/0105259 A1    8/2002    Kim ..................... 313/491
2004/0047149 A1    3/2004    Amano et al. ............. 362/225

FOREIGN PATENT DOCUMENTS

EP    1 316 987    6/2003
JP    9027298    1/1997

OTHER PUBLICATIONS

"Flachlampe" Neues Aus Der Technik, Vogel Verlang K.G. Wurzburg, DE, No. 3; Date: Sep. 15, 1988.
European Search Report for Application No. EP 05 01 4945; Date of Completion of Search : Feb. 3, 2006.
European Office Action for Application No. 05 014 945.9-2208; Dated: Feb. 6, 2007.

*Primary Examiner*—Vip Patel
(74) *Attorney, Agent, or Firm*—Cantor Colburn LLP

(57) ABSTRACT

A flat fluorescent lamp includes a lamp body and first external electrodes. The lamp body has discharge spaces formed therein. The first external electrodes are disposed at a first end portion of an outer surface of the lamp body and a second end portion that is opposite to the first end portion to define a first region where the discharge spaces overlap the first external electrodes and a second region where the discharge spaces do not overlap the first external electrodes. Each of the discharge spaces has a first width at the first region and a second width that is smaller than the first width at the second region. Therefore, an overlapping region between the first external electrodes and the discharge space increases to lower the discharge voltage.

48 Claims, 13 Drawing Sheets

FIG. 10
400
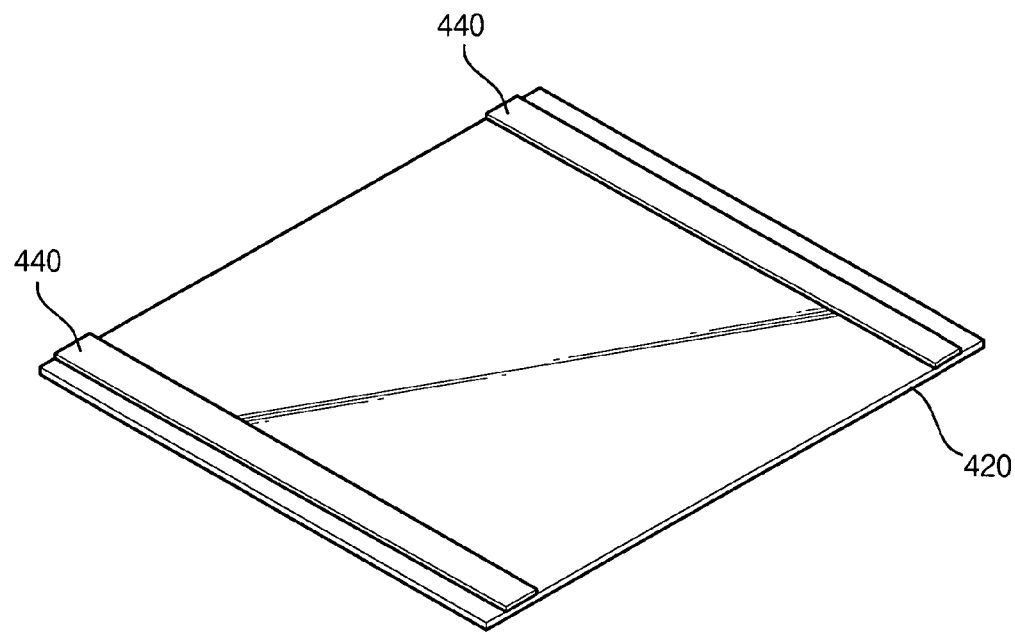
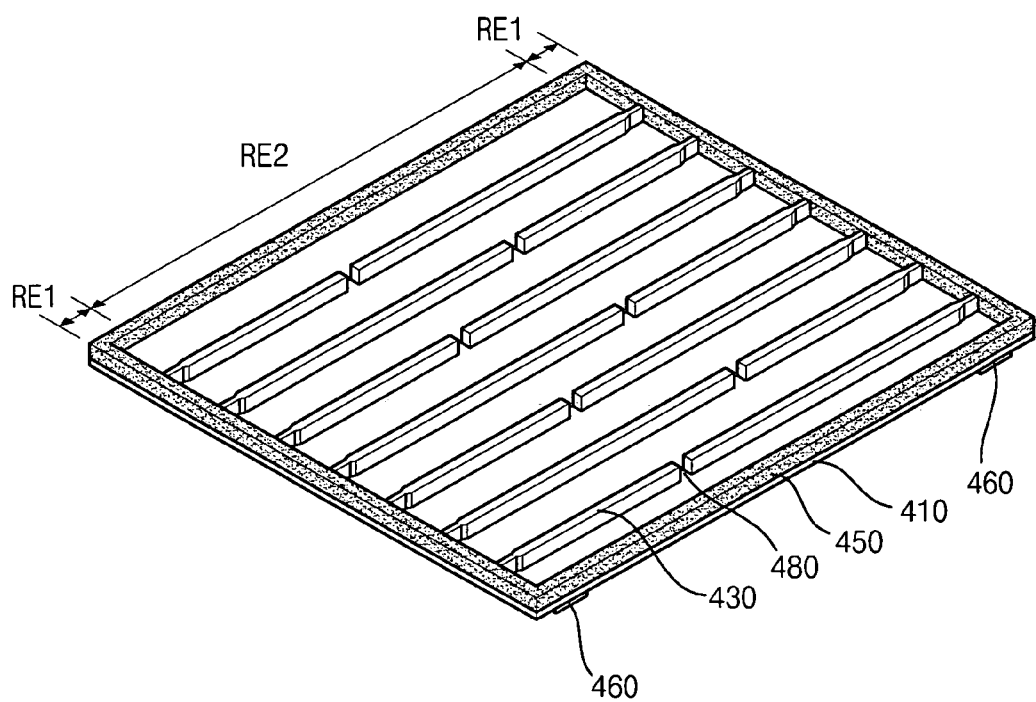

FLAT FLUORESCENT LAMP AND LIQUID CRYSTAL DISPLAY DEVICE HAVING THE SAME

This application claims priority to Korean Patent Application No. 2004-54465 filed on Jul. 13, 2004, and all the benefits accruing therefrom under 35 U.S.C §119, and the contents of which in its entirety are herein incorporated by reference.

BACKGROUND OF THE INVENTION

1. Field of the Invention

The present invention relates to a fluorescent lamp and a liquid crystal display device having the fluorescent lamp. More particularly, the present invention relates to a flat fluorescent lamp and a liquid crystal display device having the flat fluorescent lamp.

2. Description of the Related Art

A liquid crystal display (LCD) device displays images using liquid crystal. LCD devices have many merits, which have led to use of the LCD devices in various fields. Examples of the merits of the LCD devices include thin thickness, low weight, low driving voltage and low power consumption.

LCD devices control light passing through the liquid crystal to display images, however, the LCD devices themselves do not emit light. Therefore, the LCD devices require a backlight assembly to provide the light.

A conventional backlight assembly employs a cold cathode fluorescent lamp (CCFL) as a light source. The conventional backlight assembly is characterized as either an edge illumination type backlight assembly or a direct illumination type backlight assembly according to a position of the light source.

In the edge illumination type backlight assembly, one or two light sources are disposed on one or two sides of a light guide plate. Light generated by the one or two light sources enters the light guide plate through at least one side face and exits the light guide plate through an upper face of the light guide plate.

In the direct illumination type backlight assembly, light sources are disposed under an LCD panel. A diffusion plate may be interposed between the light sources and the LCD panel, and a reflection plate is disposed under the light sources to reflect light generated by the light sources toward the LCD panel.

The conventional backlight assembly loses light due to the light guide plate or the diffusion plate, which lowers a light using efficiency of the conventional backlight assembly. A structure of the conventional backlight assembly is complex, which increases a cost of manufacturing the conventional backlight assembly. Furthermore, luminance uniformity of light generated by the conventional backlight assembly is lowered.

In order to solve the above-mentioned problems, a flat fluorescent lamp has been developed. A conventional flat fluorescent lamp includes a lamp body and electrodes disposed on an outer surface of the lamp body. The lamp body has a plurality of discharge spaces spaced apart from each other. The electrodes apply discharge voltages to discharge gas disposed in the discharge spaces to generate light.

In the conventional flat fluorescent lamp, the electrodes are disposed on the outer surface of the lamp body. Therefore, a high voltage is required as the discharge voltage. Furthermore, when an area of the electrodes increases in order to lower the discharge voltage, a total size of the lamp body increases.

SUMMARY OF THE INVENTION

The present invention provides a flat fluorescent lamp capable of lowering discharge voltage within a limited size. The present invention also provides an LCD device having the above-mentioned flat fluorescent lamp.

In an exemplary flat fluorescent lamp according to the present invention, the flat fluorescent lamp includes a lamp body and first external electrodes. The lamp body has discharge spaces formed therein. The first external electrodes are disposed at a first end portion of an outer surface of the lamp body and a second end portion that is opposite to the first end portion to define a first region where the discharge spaces overlap the first external electrodes and a second region where the discharge spaces do not overlap the first external electrodes. Each of the discharge spaces has a first width at the first region and a second width that is smaller than the first width at the second region.

In another exemplary flat fluorescent lamp according to the present invention, the flat fluorescent lamp includes a first substrate, a second substrate and external electrodes. The first substrate has a plate shape. The second substrate has discharge space portions spaced apart from the first substrate to define discharge spaces, and space-dividing portions that make contact with the first substrate. Each of the space diving portions is interposed between the discharge space portions to define the discharge space portions. The first external electrodes are disposed at a first end portion of an outer surface of the second substrate and a second end portion that is opposite to the first end portion to define a first region where the discharge spaces overlap the first external electrodes and a second region where the discharge spaces do not overlap the first external electrodes. Each of the discharge spaces has a first width at the first region and a second width that is smaller than the first width at the second region.

In still another exemplary flat fluorescent lamp according to the present invention, the flat fluorescent lamp includes a first substrate, a second substrate and external electrodes. The first substrate has a plate shape. The second substrate has discharge space portions spaced apart from the first substrate to define discharge spaces, space-dividing portions that make contact with the first substrate, and sealing portions. Each of the space diving portions is disposed between the discharge space portions to define the discharge space portions. The sealing portions correspond to edge portions of the second substrate. The first and second substrates are combined with each other through the sealing portions. The external electrodes is disposed at a first end portion of an outer surface of the second substrate and a second end portion that is opposite to the first end portion to define a first region where the discharge spaces overlap the external electrodes and a second region where the discharge spaces do not overlap the external electrodes. Each of the discharge spaces has a first width at the first region and a second width that is smaller than the first width at the second region.

In still another exemplary flat fluorescent lamp according to the present invention, the flat fluorescent lamp includes a first substrate, a second substrate, partition members and external electrodes. The first substrate has a plate shape. The second substrate has a substantially identical shape with the first substrate. The second substrate is combined with the first substrate to define an inner space between the first and second substrates. The partition members are disposed between the first and second substrates to divide the inner space into discharge spaces. The external electrodes are disposed at a first end portion of an outer surface of at least one of the first and second substrates and a second end portion that is opposite to the first end portion to define a first region where the discharge spaces overlap the external electrodes and a second region where the discharge spaces do not overlap the external electrodes. Each of the partition members has a first width at the first region and a second width that is greater than the first width at the second region.

In an exemplary liquid crystal display (LCD) device according to the present invention, the LCD device includes a flat fluorescent lamp, a liquid crystal display panel and an inverter. The flat fluorescent lamp includes a lamp body and external electrodes. The lamp body has discharge spaces formed therein. The external electrodes are disposed at a first end portion of an outer surface of the lamp body and a second end portion that is opposite to the first end portion to define a first region where the discharge spaces overlap the external electrodes and a second region where the discharge spaces do not overlap the external electrodes. Each of the discharge spaces has a first width at the first region and a second width that is smaller than the first width at the second region. The liquid crystal display panel displays images using light generated by the flat fluorescent lamp. The inverter applies a discharge voltage to the external electrodes.

According to the flat fluorescent lamp and the LCD device having the flat fluorescent lamp, an overlapping region between the external electrode and the discharge space increases to lower the discharge voltage.

Furthermore, a sealing region may not be reduced to stabilize combination between the first and second substrates.

BRIEF DESCRIPTION OF THE DRAWINGS

The above and other features and advantages of the present invention will become more apparent by describing in detail exemplary embodiments thereof with reference to the accompanying drawings, in which:

FIG. 10 is an exploded perspective view illustrating a flat fluorescent lamp according to another exemplary embodiment of the present invention;

DETAILED DESCRIPTION OF THE INVENTION

It should be understood that the exemplary embodiments of the present invention described below may be modified in many different ways without departing from the inventive principles disclosed herein, and the scope of the present invention is therefore not limited to these particular flowing embodiments. Rather, these embodiments are provided so that this disclosure will be thorough and complete, and will fully convey the concept of the invention to those skilled in the art by way of example and not of limitation.

Hereinafter, the embodiments of the present invention will be described in detail with reference to the accompanied drawings.

Figure 1:
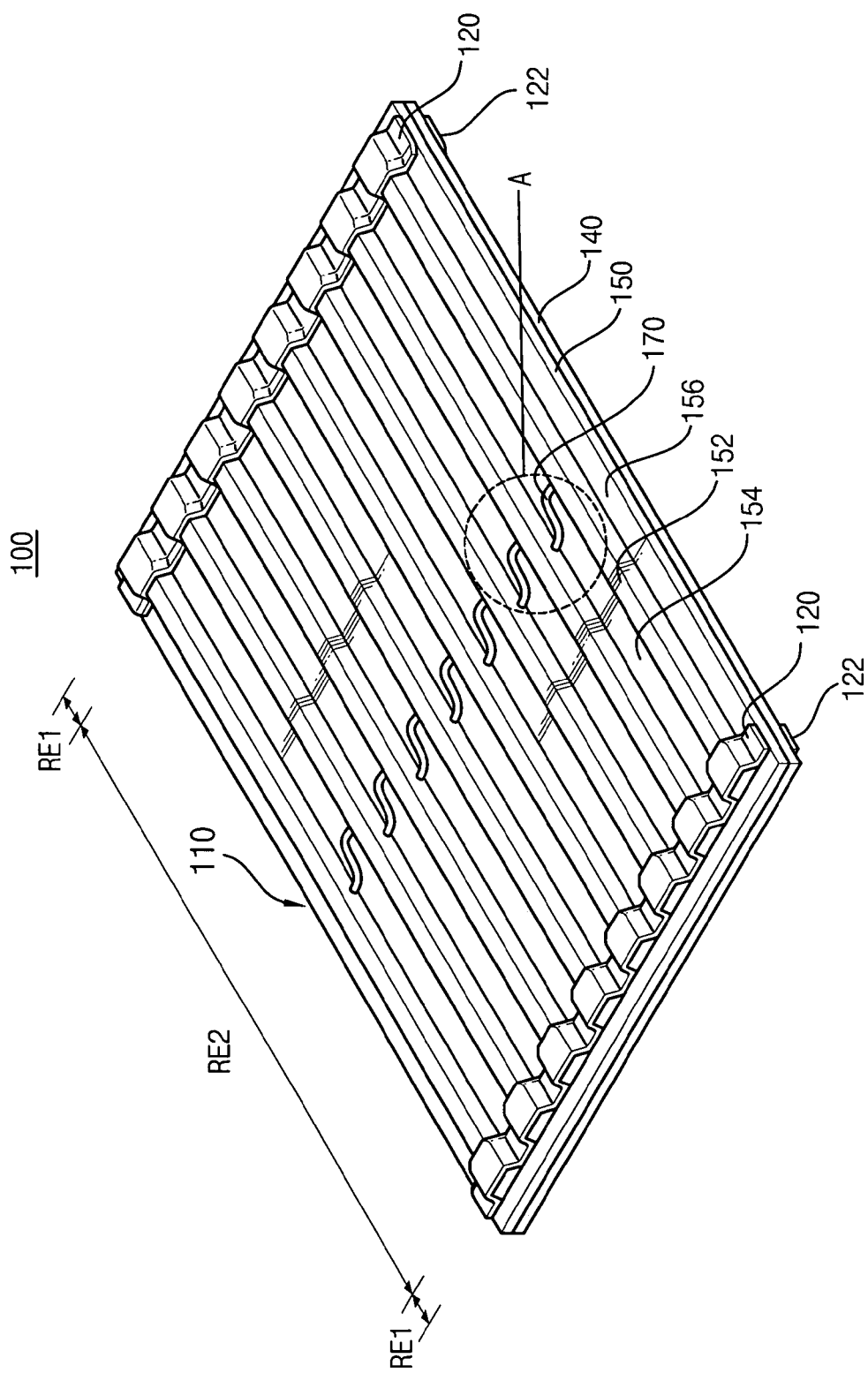
FIG. 1 is a perspective view illustrating a flat fluorescent lamp according to an exemplary embodiment of the present invention.
Figure 2:
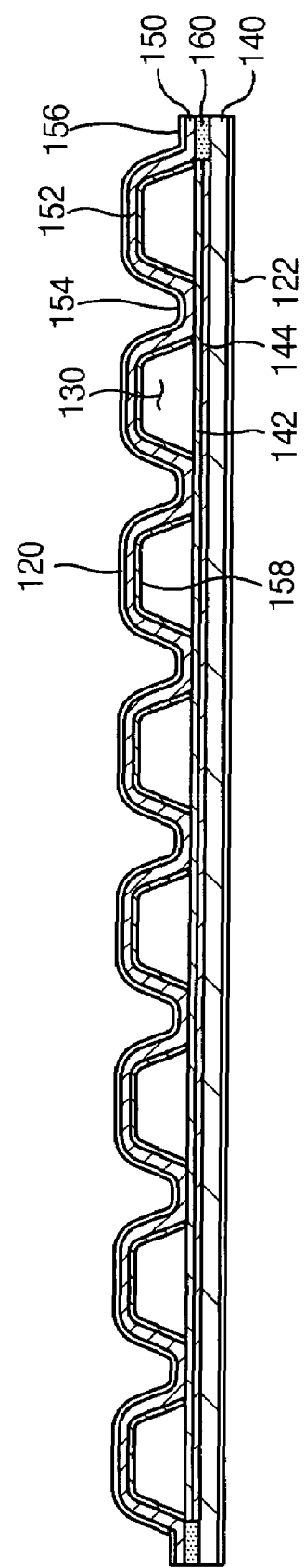
FIG. 2 is a cross-sectional view illustrating the flat fluorescent lamp in FIG. 1.

FIG. 1 is a perspective view illustrating a flat fluorescent lamp according to an exemplary embodiment of the present invention, and FIG. 2 is a cross-sectional view illustrating the flat fluorescent lamp in FIG. 1.

Referring to FIGS. 1 and 2, a flat fluorescent lamp 100 includes a lamp body 110 and first external electrodes 120. The lamp body 110 has discharge spaces 130 extended substantially parallel to each other. The first external electrodes 120 are disposed at first and second end portions of the lamp body 110. The first external electrodes 120 are disposed such that a longitudinal direction of the first external electrodes 120 is substantially perpendicular to a longitudinal direction of the discharge spaces 130. The first external electrodes 120 overlap all of the discharge spaces 130. The flat fluorescent lamp 100 may further include second external electrodes 122 disposed opposite to the first external electrodes with respect to the lamp body 110.

The lamp body 110 includes a first region RE1 and a second region RE2. The first region RE1 corresponds to a portion of the lamp body 110 at which the discharge spaces 130 are covered by the first external electrodes 120, and the second region RE2 corresponds to a portion of the lamp body 110 at which the discharge spaces 130 are not covered by the first external electrodes 120. A width of the discharge spaces 130 in the first region RE1 is greater than a width of the discharge spaces 130 in the second region RE2. In other words, the portion of each of the discharge spaces 130 in the first region RE1 is wider than the portion of each of the discharge spaces 130 in the second region RE2 in order to increase an overlapping area between the first external electrodes 120 and the discharge spaces 130.

The lamp body 110 includes a first substrate 140 and a second substrate 150. The first and second substrates 140 and 150 combine with each other to define the discharge spaces 130. The first substrate 140 has, for example, a rectangular plate shape. For example, a glass substrate that transmits visible light and blocks ultraviolet light may be employed as the first substrate 140 and the second substrate 150.

The second substrate 150 includes discharge space portions 152, space-dividing portions 154 and a sealing portion 156. The discharge space portions 152 are spaced apart from the first substrate 140 when the first and second substrates 140 and 150 are combined with each other. The space-dividing portions 154 are defined between the discharge space portions 152. The space diving portions 154 make contact with the first substrate 140 when the first and second substrates 140 and 150 are combined with each other. The sealing portion 156 corresponds to edge portions of the second substrate 150. The first and second substrates 140 and 150 are combined with each other through the sealing portion 156.

The discharge space portions 152 are spaced apart from each other. The discharge space portions 152 extend substantially parallel to each other. Each of the discharge space portions 152 includes a portion disposed in the first region RE1 that is covered by the first external electrodes 120, and a portion disposed in the second region RE2 that is not covered by the first external electrodes 120. The discharge space portions 152 make contact with the first external electrodes 120 in the first region RE1. The portion of the discharge space portions 152 disposed in the first region RE1 has a wider width than the portion of the discharge space portions 152 disposed in the second region RE2 in order to increase an overlapping area between the first external electrodes 120 and the discharge space portions 152.

The second substrate 150 being shaped as described above may be formed, for example, through a forming process. For example, a flat base substrate is heated and processed by a mold to form the second substrate 150 having the discharge space portions 152, the space-dividing portions 154 and the sealing portion 156. Alternatively, the second substrate 150 may be formed by blowing air into portions of a heated base substrate.

A cross-section of the second substrate 150 has, for example, a plurality of rounded trapezoidal portions aligned in a series. Each of the rounded trapezoidal portions represents a trapezoidal shape having rounded edges. Alternatively, the cross-section of the second substrate 150 may have a plurality of semicircular shapes, a plurality of rectangular shapes, etc.

The first and second substrates 140 and 150 are combined with each other, for example, through a sealing member 160 such as frit. The frit is a mixture of glass and metal. The frit has a lower melting point than glass. For example, the sealing member 160 is disposed between the first substrate 140 and the sealing portion 156 of the second substrate 150 and then the sealing member 160 is heated to combine the first and second substrates 140 and 150. The sealing member 160 is not disposed between the first substrate 140 and the space-dividing portions 154 of the second substrate 150. However, the space-dividing portions 154 of the second substrate 150 are compressed toward the first substrate 140 to make contact with the first substrate 140 due to a pressure difference between inside and outside of the lamp body 110.

For example, when the first and second substrates 140 and 150 are combined with each other, air disposed in the discharge spaces 130 is exhausted, and then discharge gas is injected into the discharge spaces 130. The discharge gas may include, for example, mercury (Hg), neon (Ne), argon (Ar), xenon (Xe), krypton (Kr), etc. such that a pressure of the discharge spaces 130 becomes about 50 torr. Atmospheric pressure is about 760 torr, which is much greater than the pressure of the discharge spaces 130. Therefore, the first and second substrates 140 and 150 are compressed toward each other, so that the space-diving portions 154 of the second substrate 150 make contact with the first substrate 140.

The second substrate 150 includes a connection path 170. The connection path 170 connects the discharges spaces 130 with each other. At least one connection path 170 is disposed at each of the space-dividing portions 154. The discharge gas may move freely from one discharge space 130 to an adjacent discharge space 130 through the connection path 170. Therefore, each of the discharge spaces 130 has a same pressure.

The first external electrodes 120 are disposed at an outer surface of the second substrate 150. The first external electrodes 120 are disposed at opposite end portions of the second substrate 150.

The first external electrodes 120 may be formed through various methods. For example, metal powder including metal having a high electrical conductivity such as copper (Cu), nickel (Ni), silver (Ag), gold (Au), aluminum (Al), chromium (Cr), etc. is sprayed onto the outer surface of the second substrate 150 being coated in order to form the first external electrodes 120. In detail, a mask that exposes a portion of the second substrate 150 at which the first external electrodes 120 are to be disposed and covers other portions of the second substrate is disposed on the second substrate 150. Then, the portion of the second substrate 150 at which the first external electrodes 120 are to be disposed is spray coated with the metal powder. Then, the mask is removed to complete the first external electrodes 120. Alternatively, an aluminum (Al) tape or a conductive tape such as a silver (Ag) paste may be employed as the first external electrodes 120. Electrically conductive and optical transparent material such as indium tin oxide (ITO), indium zinc oxide (IZO), etc. may be used for the first external electrodes 120. The first external electrodes 120 apply discharge voltages to the lamp body 110 to generate plasma in the discharge spaces 130.

The lamp body 110 further includes a first fluorescent layer 142, a light-reflecting layer 144 and a second fluorescent layer 158. The light-reflecting layer 144 is disposed at an inner surface of the first substrate 140, and the first fluorescent layer 142 is disposed at the light-reflecting layer 144. The second fluorescent layer 158 is disposed at an inner surface of the second substrate 150. In an exemplary embodiment, the second fluorescent layer 158 is only disposed at portions of the second substrate 150 corresponding to the discharge space portions 152.

The first and second fluorescent layers 142 and 158 transform ultraviolet light generated by plasma discharge into visible light. The light-reflecting layer 144 reflects the visible light toward the second substrate 150 to prevent the visible light from leaking through the first substrate 140.

The lamp body 110 may further include a protection layer (not shown) disposed between the second substrate 150 and the second fluorescent layer 158. The protection layer may also be disposed between the first substrate 140 and the light-reflecting layer 144. The protection layer prevents a chemical reaction between mercury (Hg) in the discharge gas and the first and second substrates 140 and 150 to prevent loss of mercury and prevent the lamp body 110 from being blackened.

Figure 3:
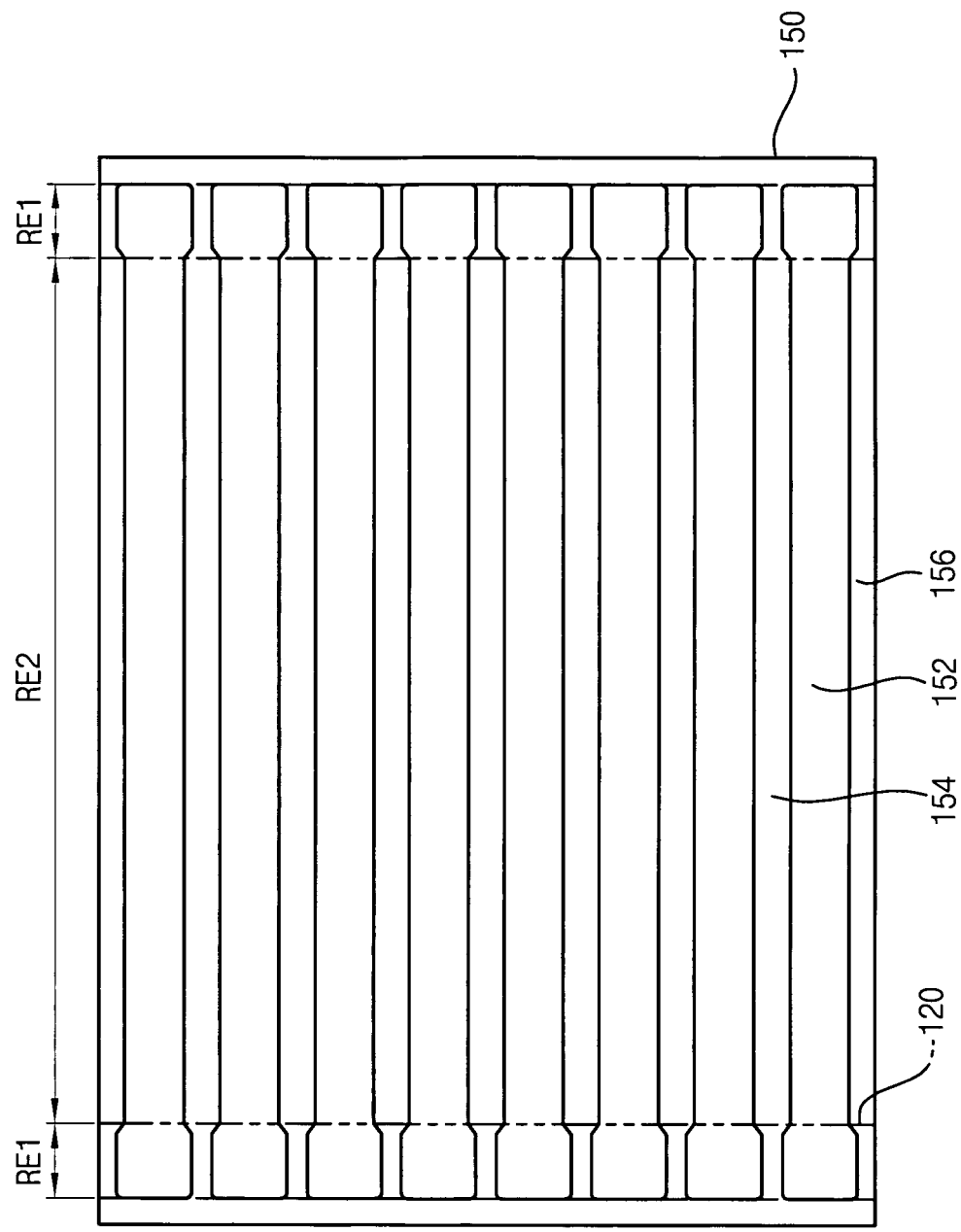
FIG. 3 is a plan view illustrating a second substrate in FIG. 1.
Figure 4:
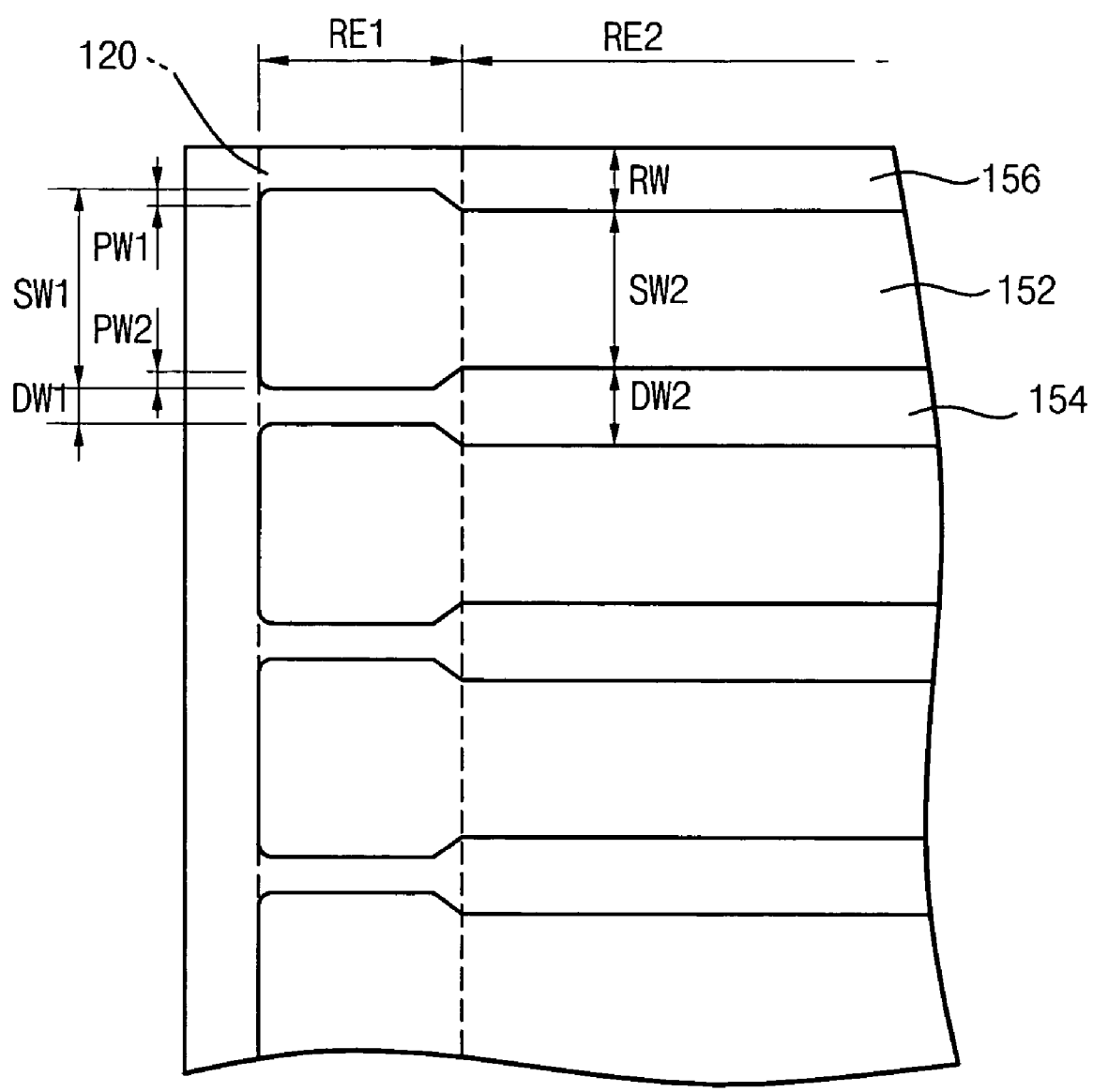
FIG. 4 is an enlarged view illustrating a portion of the second substrate in FIG. 3.

FIG. 3 is a plan view illustrating a second substrate in FIG. 1, and FIG. 4 is an enlarged view illustrating a portion of the second substrate in FIG. 3.

Referring to FIGS. 3 and 4, the second substrate 150 includes the discharge space portions 152, the space-dividing portions 154 and the sealing portion 156. The discharge space portions 152 extend substantially parallel to each other, and distances between the discharge space portions 152 are substantially constant. The space-dividing portions 154 and the discharge space portions 152 alternate with each other. In other words, each space-dividing portion 154 is disposed between the discharge space portions 152. The sealing portion 156 corresponds to edge portions of the second substrate 150.

The lamp body 110 includes the first region RE1 and the second region RE2. The first region RE1 is covered by the first external electrodes 120, and the second region RE2 is not covered by the first external electrodes 120. Each discharge space portion 152 has a first width SW1 at the first region RE1 and a second width SW2 at the second region RE2. In other words, portions of the discharge space portions 152 in the first region RE1 have the first width SW1, and portions of the discharge space portions 152 in the second region RE2 have the second width SW2. The first and second widths SW1 and SW2 represent a width measured along a longitudinal direction of the first external electrodes 120.

The first width SW1 and the second width SW2 are fixed, so that each of the discharge space portions 152 has an identical shape. The first width SW1 is greater than the second width SW2. A width of each of the discharge space portions 152 is changed gradually between the first width SW1 to the second width SW2 at a boundary region of the first and second regions RE1 and RE2. In response to the width of the discharge space portions 152 decreasing abruptly to form a stepped shape, negative glow discharge may occur, which lowers light-using efficiency. Thus, the width of the discharge space portions 152 changes gradually at the boundary region. Edges of the discharge space portions 152 may have a rounded shape. The first external electrodes 120 are shaped to correspond to the shapes of the portions of the discharge space portions 152 that are in the first region RE1. In other words, the first external electrodes 120 include portions that protrude away from the first substrate 140 and have a width corresponding to the first width SW1 at a first transverse end of the first external electrodes and a taper to the second width SW2 at a second transverse end.

Each discharge space portion 152 has a symmetrical shape with respect to a longitudinal centerline of each discharge space portion 152, wherein the longitudinal centerline represents a line passing through a center of the discharge space portion 152 along a longitudinal direction. The longitudinal centerline is an imaginary line that is drawn on a surface of the second substrate 150 and is viewed from above the second substrate. For example, a first side of a discharge space portion 152 in the first region RE1 is spaced apart from a first side of the discharge space portion 152 in the second region RE2 in a direction substantially perpendicular to a longitudinal direction of the discharge space portion 152 by a first recessed gap PW1, and a second side of the discharge s pace portion 152 in the first region RE1 is spaced apart from a second side of the discharge space portion 152 in the second region RE2 in a direction opposite to that of the first recessed gap PW1 by a second recessed gap PW2 that is substantially equal to the first recessed gap PW1. The first and second recessed gaps PW1 and PW2 are spaced apart such that a width of the discharge space portion 152 in the first region RE1 is greater that the width of the discharge space portion 152 in the second region RE2.

Luminance of light generated from the discharge spaces 130 increases when currents flowing through the discharge spaces 130 increase. Generally speaking, an increase in currents flowing through the discharge spaces 130 requires an increase in discharge voltage applied to the first external electrode 120. However, in response to increasing an overlapping area between the first external electrodes 120 and the discharge space portions 152, the currents flowing through the discharge spaces 130 increase without increasing the discharge voltage for driving the flat fluorescent lamp 100.

Each of the space-dividing portions 154 has a first space-dividing portion width DW1 in the first region RE1 and a second space-dividing portion width DW2 in the second region RE2. The second space-dividing portion width DW2 is wider than the first space-dividing portion width DW1. In other words, neighboring discharge space portions 152 are spaced apart by the first and second space-dividing portion widths DW1 and DW2 at the first and second regions RE1 and RE2, respectively.

The first width SW1 is, for example, about 12 mm, and a second width SW2 is, for example, about 10 mm. The first space-dividing portion width DW1 is, for example, 2 mm, and the second space-dividing portion width DW2 is, for example, 4 mm. Therefore, the first recessed gap PW1 is about 1 mm, and the second recessed gap PW2 is about 1 mm. A sealing width RW that corresponds to a width of the sealing portion 156 is, for example, about 3 mm.

Figure 5:
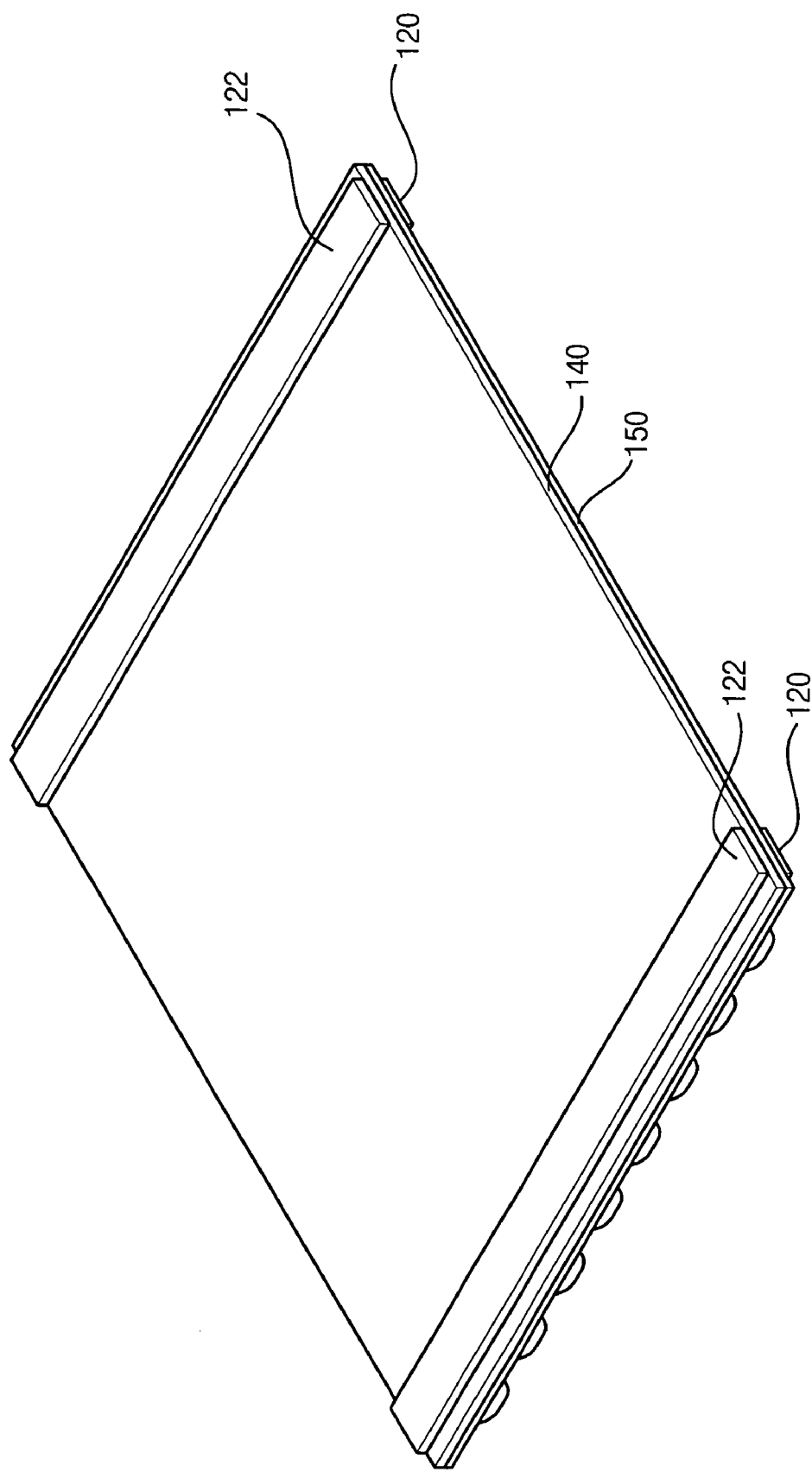
FIG. 5 is a perspective view illustrating a backside of the flat fluorescent lamp in FIG. 1.

FIG. 5 is a perspective view illustrating a backside of the flat fluorescent lamp in FIG. 1.

Referring to FIG. 5, the flat fluorescent lamp 100 may further include the second external electrodes 122. The second external electrodes 122 are disposed at an outer surface of the first substrate 140. The second external electrodes 122 are disposed at first and second end portions of the first substrate 140, respectively. The second external electrodes 122 correspond to the first external electrodes 120. When the first and second external electrodes 120 and 122 are disposed at the first and second substrates 140 and 150, respectively, a conducting clip (not shown) may electrically connect the first and second external electrodes 120 and 122. The second external electrodes 122 have, for example, a same width as that of the first external electrodes 120. Alternatively, the second external electrodes 122 may have a wider width than that of the first external electrodes 120 in order to increase an overlapping area between the first substrate 140 and the second external electrodes 122. Light generated from the discharge space portions 152 of the lamp body 110 exits the lamp body 110 through the second substrate 150. Therefore, the second external electrodes 122 do not block the light exiting the lamp body 110, even when a width of the second external electrodes 122 increases.

Figure 6:
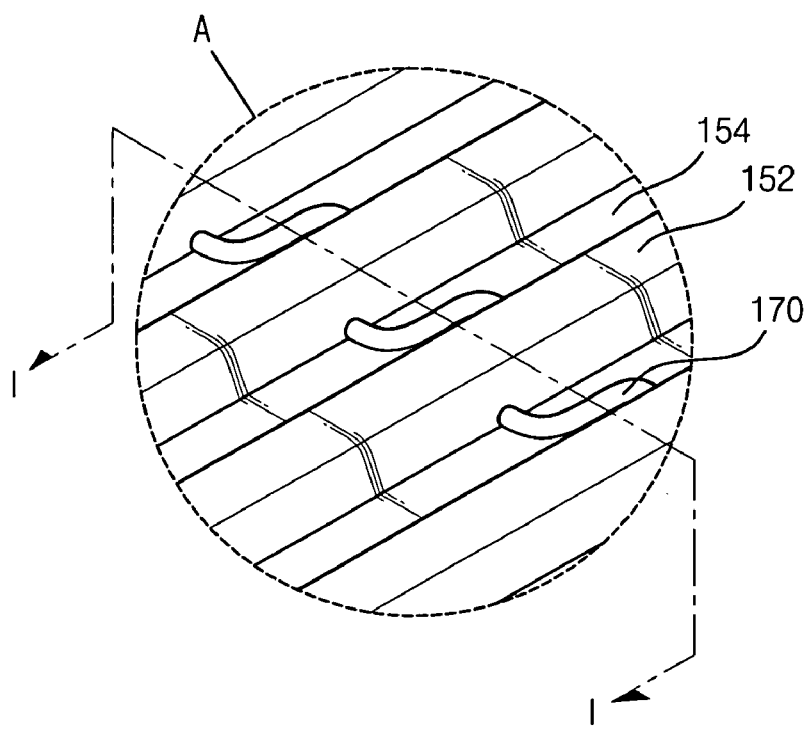
FIG. 6 is an enlarged view illustrating a portion 'A' in FIG. 1.
Figure 7:
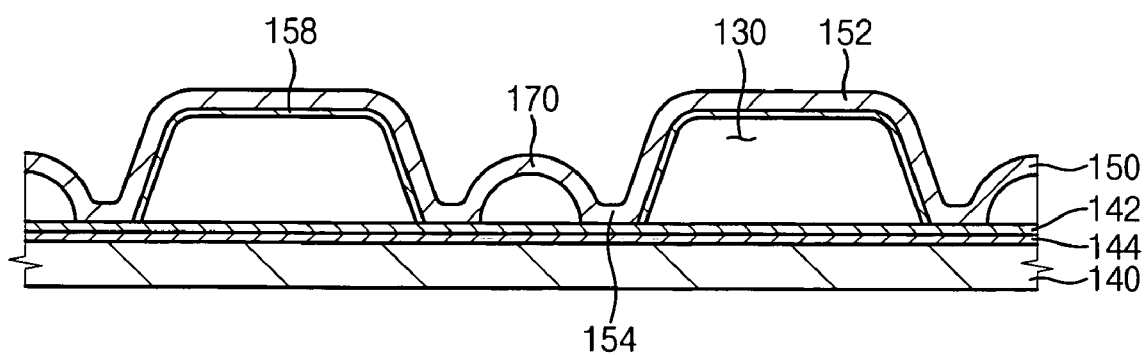
FIG. 7 is a cross-sectional view taken along line I-I' in FIG. 6.

FIG. 6 is an enlarged view illustrating a portion 'A' in FIG. 1, and FIG. 7 is a cross-sectional view taken along line I-I' in FIG. 6.

Referring to FIGS. 6 and 7, at least one connection path 170 is disposed at each of the space-dividing portions 154. The connection path 170 connects neighboring discharge spaces 130. When the first and second substrates 140 and 150 are combined with each other, a portion of the second substrate 150 is spaced apart from the first substrate 140 to define the connection path 170. The connection path 170 has, for example, an S-shape to increase a length of the connection path 170 in order to prevent plasma generated in one discharge space 130 from moving to other discharge spaces 130. Therefore, channeling of plasma is prevented.

The connection path 170 is disposed at a center portion of each of the space-dividing portions 154 along a longitudinal direction of the space-dividing portions 154. The connection path 170 has, for example, a width of about 2 mm, and a height of about 2 mm. More than one connection path 170 may be disposed at the space-dividing portions 154, and the connection path 170 may have various shapes.

Figure 8:
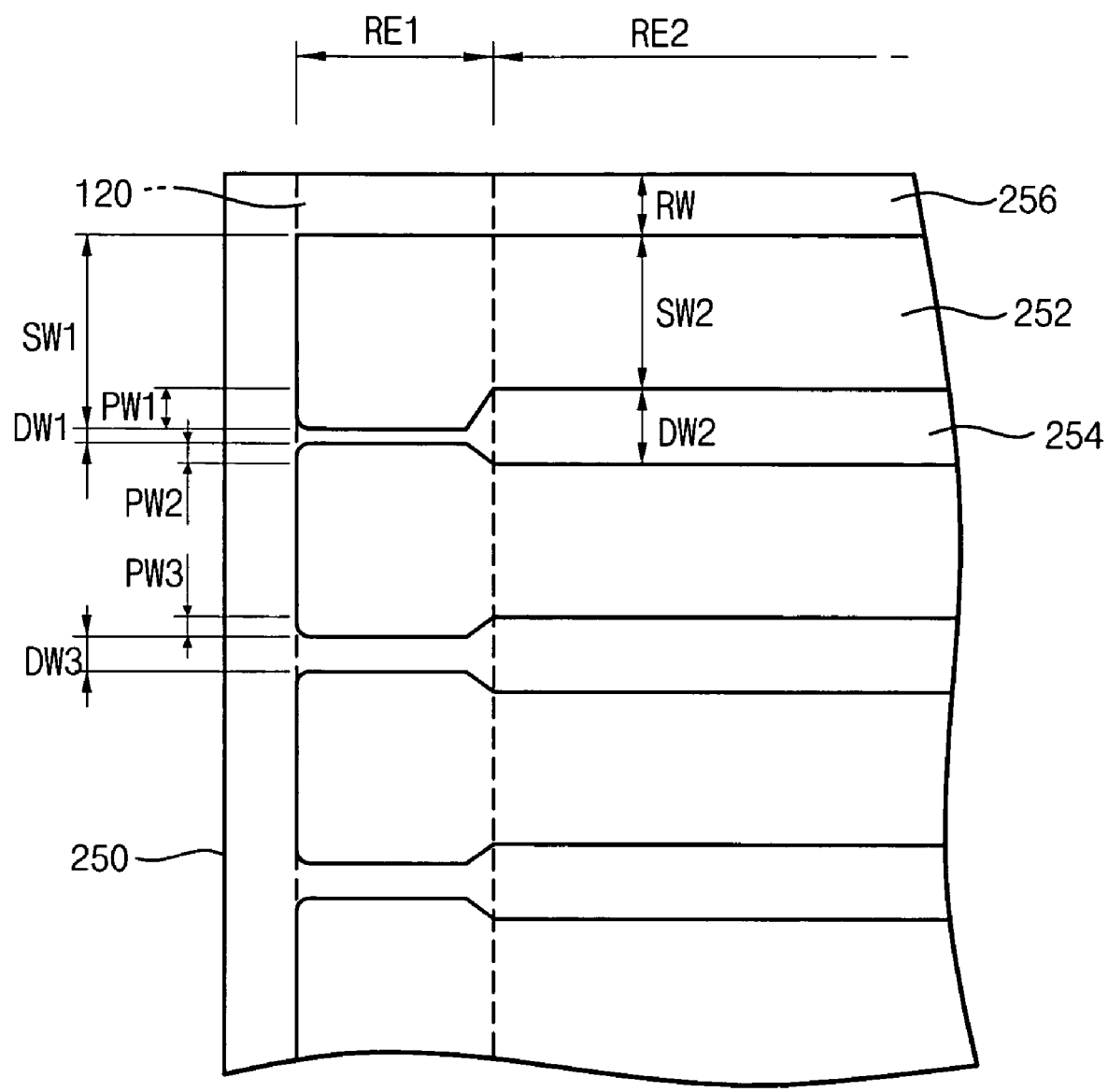
FIG. 8 is a plan view illustrating a second substrate according to an exemplary embodiment of the present invention.

FIG. 8 is a plan view illustrating a second substrate according to an exemplary embodiment of the present invention. The flat fluorescent lamp of this exemplary embodiment has substantially a same structure as that of the flat fluorescent lamp 110 of the exemplary embodiment of FIG. 1 except for a second substrate. Therefore, any further explanation regarding identical elements will be omitted.

Referring to FIG. 8, a second substrate 250 includes discharge space portions 252, space-dividing portions 254 and a sealing portion 256. The discharge space portions 252 extend substantially parallel to each other and are spaced apart by a constant distance. Each of the space-dividing portions 254 is disposed between two neighboring discharge space portions 252. In other words, the discharge space portions 252 and the space-dividing portions 254 alternate with each other. The sealing portion 252 corresponds to edge portions of the second substrate 250.

Each discharge space portion 252 includes a portion of the discharge space portion 252 disposed in the first region RE1 and a portion of the discharge space portion 252 disposed in the second region RE2. The first external electrodes 120 cover the first region RE1. Each of the discharge space portions 252 has a first width SW1 at the first region RE1, and a second width SW2 at the second region RE2. The first and second widths SW1 and SW2 represent a width measured along a longitudinal direction of the first external electrodes 120.

The first width SW1 is constant for each of the discharge space portions 252 and the second width SW2 is constant for each of the discharge space portions 252. The first width SW1 is greater than the second width SW2. A width of the discharge space portions 252 is changed gradually from the first width SW1 to the second width SW2 at the boundary region of the first and second regions RE1 and RE2. Edges of the discharge space portions 252 may have a rounded shape.

According to this exemplary embodiment, a discharge space portion 252 that is disposed outermost (or that is closest to an edge portion of the second substrate 250, the edge portion being substantially parallel to a longitudinal direction of the discharge space portion 252) has a different shape from a shape of other discharge space portions 252. The sealing portion 256 of the first region RE1 has a substantially same width as the sealing portion 256 of the second region RE2 in order to enhance a stability of combination between the first substrate 140 and the second substrate 250. The discharge space portion 252 that is disposed outermost has a first recessed gap PW1 at the first region RE1. The discharge space portion 252 disposed outermost has a straight side corresponding to an edge of the sealing portion 256.

The discharge space portions 252 except for the discharge space portion 252 disposed outermost have a symmetrical shape with respect to a longitudinal centerline of the discharge space portions 252. The longitudinal centerline represents a line passing through a center of the discharge space portions 252 along a longitudinal direction. For example, a first side of the discharge space portion 252 of the first region RE1 is spaced apart from a first side of the discharge space portion 252 of the second region RE2 in a direction substantially perpendicular to a longitudinal direction of the discharge space portion 252 by a second recessed gap PW2, and a second side of the discharge space portion 252 of the first region RE1 is spaced apart from a second side of the discharge space portion 252 of the second region RE2 in a direction opposite to that of the second recessed gap PW2 by a third recessed gap PW3 that is substantially equal to the second recessed gap PW2. The second and third recessed gaps PW2 and PW3 are spaced apart such that a width of the discharge space portion 252 in the first region RE1 is greater that the width of the discharge space portion 252 in the second region RE2.

All of the discharge space portions 252 have substantially a same first width SW1 at the first region RE1. Therefore, a sum of the second and third recessed gaps PW2 and PW3 is equal to the first recessed gap PW1. In other words, the first recessed gap PW1 is double the second or third recessed gap PW2 or PW3.

All space-dividing portions 254 have a second dividing portion width DW2 at the second region RE2. A space-dividing portion 254 disposed outermost (or that is closest to the edge portion of the second substrate 250, the edge portion being substantially parallel to a longitudinal direction of the space-dividing portion 254) has a first space-dividing portion width DW1 at the first region RE1. The space-dividing portions 254 except for the space-dividing portions 254 disposed outermost have a third space-dividing portion width DW3. The first space-dividing portion width DW1 is smaller than the third space-dividing portion width DW3.

The first width SW1 is, for example, about 12 mm, and the second width SW2 is about 10 mm. The first space-dividing portion width DW1 is, for example, about 1 mm, the second space-dividing portion width DW2 is, for example, about 4 mm, and the third space-dividing portion width DW3 is, for example, about 2 mm. The first recessed gap PW1 is, for example, about 2 mm, the second recessed gap PW2 is, for example, about 1 mm, and the third recessed gap PW3 is, for example, a bout 1 mm.

Figure 9:
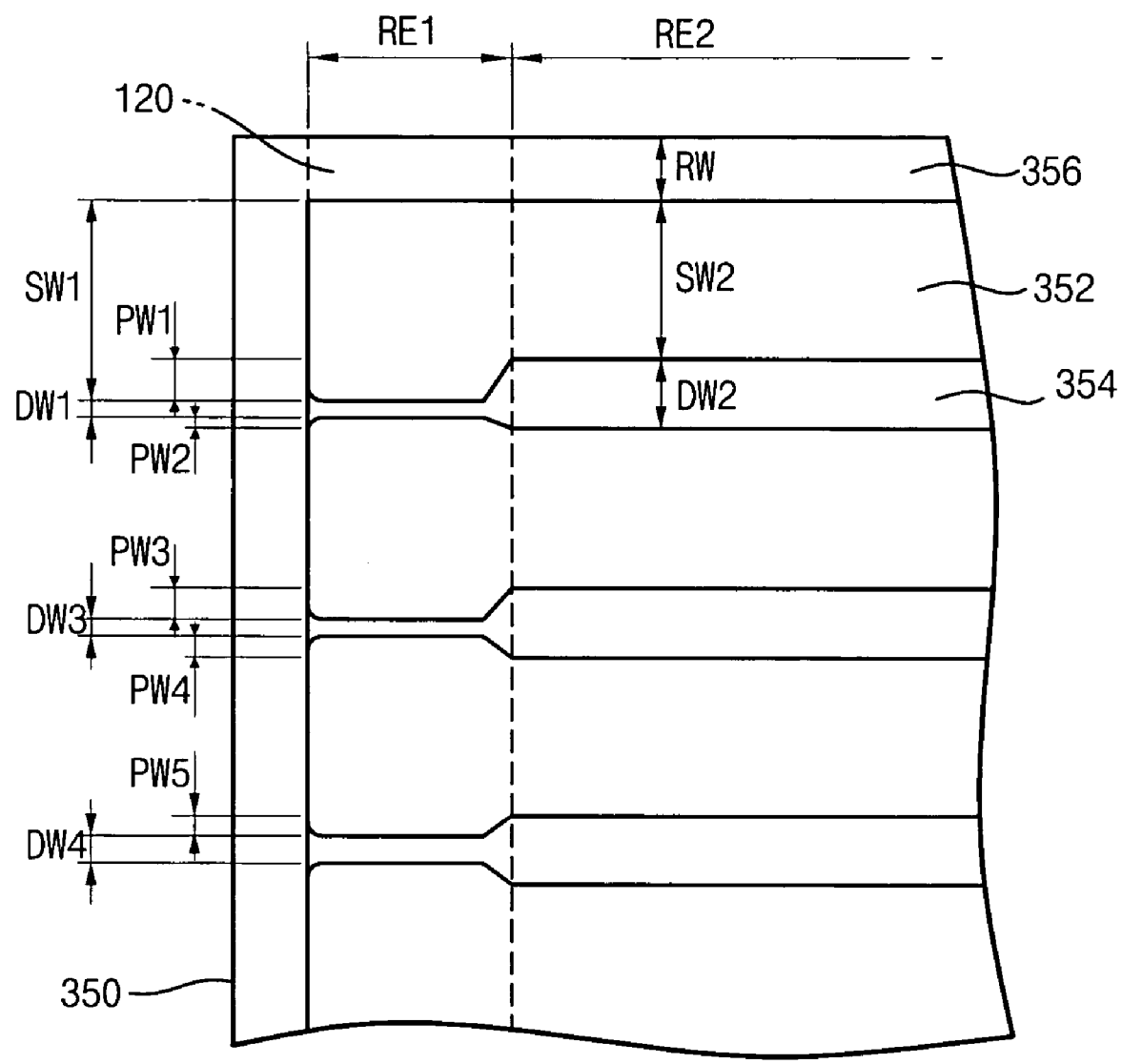
FIG. 9 is a plan view illustrating a second substrate according to another exemplary embodiment of the present invention.

FIG. 9 is a plan view illustrating a second substrate according to another exemplary embodiment of the present invention. The flat fluorescent lamp of this exemplary embodiment has substantially the same structure as that of the flat fluorescent lamp 110 of the exemplary embodiment of FIG. 1 except for a second substrate. Therefore, any further explanation regarding identical elements will be omitted.

Referring to FIG. 9, a second substrate 350 includes discharge space portions 352, space-dividing portions 354 and a sealing portion 356. The discharge space portions 352 extend substantially parallel to each other and are spaced apart by a constant distance. Each of the space-dividing portions 354 is disposed between two neighboring discharge space portions 352. In other words, the discharge space portions 352 and the space-dividing portions 354 alternate with each other. The sealing portion 352 corresponds to edge portions of the second substrate 350.

Each discharge space portion 352 includes a portion of the discharge space 352 disposed at the first region RE1 and a portion of the discharge space 352 disposed at the second region RE2. The first external electrodes 120 cover the first region RE1. Each of the discharge space portions 352 has a first width SW1 at the first region RE1, and a second width SW2 at the second region RE2. The first and second widths SW1 and SW2 represent a width measured along a longitudinal direction of the first external electrodes 120.

The first width SW1 is constant for each of the discharge space portions 352 and the second width SW2 is constant for each of the discharge space portions 352. The first width SW1 is greater than the second width SW2. A width of the discharge space portions 352 is changed gradually from the first width SW1 to the second width SW2 at t he boundary region of the first and second regions RE1 and RE2. Edges of the discharge space portions 352 may have a rounded shape.

According to this exemplary embodiment, neighboring discharge space portions 352 that are outermost and second outermost (or that are closest and second closest to an end portion of the second substrate 350, the end portion being substantially parallel to a longitudinal direction of the discharge space portions 352) have a different shape from that of other discharge space portions 352. The sealing portion 356 at the first region RE1 has a substantially same width as the sealing portion 356 at the second region RE2 in order to enhance a stability of combination between the first substrate 140 and the second substrate 350. A discharge space portion 352 that is disposed outermost has a first recessed gap PW1 at the first region RE1. The discharge space portion 252 disposed outermost has a straight side corresponding to an edge of the sealing portion 352.

A discharge space portion 352 that is disposed second outermost has a second recessed gap PW2 and a third recessed gap PW3 at the first region RE1. The second recessed gap PW2 is opposite to the first recessed gap PW1 with respect to the discharge space portion 352. The first recessed gap PW1 is greater than the third recessed gap PW3. The third recessed gap PW3 is greater than the second recessed gap PW2.

The discharge space portions 352, except for the two neighboring discharge space portions 352 that are disposed outermost and second outermost, each have a symmetrical shape with respect to a longitudinal centerline of the discharge space portions 352. The longitudinal centerline represents a line passing through a center of the discharge space portions 352 along a longitudinal direction. For example, a first side of a discharge space portion 352 at the first region RE1 is spaced apart from a first side of a discharge space portion 352 of the second region RE2 in a direction substantially perpendicular to a longitudinal direction of the discharge space portion 352 by a fourth recessed gap PW4, and a second side of the discharge space portion 352 of the first region RE1 is spaced apart from a second side of the discharge space portion 352 of the second region RE2 in a direction opposite to that of the fourth recessed gap PW4 by a fifth recessed gap PW5 that is substantially equal to the fourth recessed gap PW4. The fourth recessed gap PW4 is greater than the second recessed gap PW2, but the fourth recessed gap PW4 is smaller than the third recessed gap PW3. The fourth and fifth recessed gaps PW4 and PW5 are spaced apart such that a width of the discharge space portion 352 in the first region RE1 is greater that the width of the discharge space portion 352 in the second region RE2.

All of the discharge space portions 352 have substantially a same first width SW1 at the first region RE1. Therefore, a sum of the second and third recessed gaps PW2 and PW3 is equal to the first recessed gap PW1, and a sum of the fourth and fifth recessed gaps PW4 and PW5 is equal to the first recessed gap PW1. In other words, the first recessed gap PW1 is double the fourth or fifth recessed gap PW4 or PW5.

All space-dividing portions 354 have a second space-dividing portion width DW2 at the second region RE2. A space-dividing portion 354 that is disposed outermost (or that is disposed closest to edge portions of the second substrate 350, the edge portions being substantially parallel to a longitudinal direction of the space-dividing portion 354) has a first space-dividing portion width DW1 at the first region RE1, a space-dividing portion 354 that is second closest to the edge portions of the second substrate 350 has a third space-dividing portion width DW3 at the first region RE1, and the space-dividing portions 354 except for the space-dividing portions 354 that are closest and second closest to the edge portions of the second substrate 350 have a fourth space-dividing portion width DW4. The fourth space-dividing portion width DW4 is smaller than the second space-dividing portion width DW2. The first space-dividing portion width DW1 is substantially same as the third space-dividing portion width DW3. The first space-dividing portion width DW1 is smaller than the fourth space-dividing portion width DW4.

The first width SW1 is, for example, about 12 mm, and the second width SW2 is about 10 mm. The first space-dividing portion width DW1 is, for example, about 1.5 mm, the second space-dividing portion width DW2 is, for example, about 4 mm, the third space-dividing portion width DW3 is, for example, about 1.5 mm, and the fourth space-dividing portion width DW4 is, for example, about 2 mm. The first recessed gap PW1 is, for example, about 2 mm, the second recessed gap PW2 is, for example, about 0.5 mm, the third recessed gap PW3 is, for example, about 1.5 mm, the fourth recessed gap PW4 is, for example, about 1 mm, and the fifth recessed gap PW5 is, for example, about 1 mm.

According to this exemplary embodiment, for example, only the two neighboring space-dividing portions 354 that are closest and second closest to the edge portions of the second substrate 350 have different widths at the first region RE1 from that of other space-dividing portions 354. Alternatively, a width of the space-dividing portions 354 may decrease gradually when a distance between the space-dividing portions 354 and the edge portions of the second substrate 350 decreases.

It should be noted that although FIG. 9 shows that only the two neighboring space-dividing portions 354 that are closest and second closest to the edge portions of the second substrate 350 have different widths at the first region RE1 from that of other space-dividing portions 354, a closest to an 'n-th' closest space-dividing portion 354 may have different widths at the first region RE1 from that of other space-dividing portions 354. In such a case, 'n' corresponds to a number equal to or greater than two and 'n-th' is an ordinal number of 'n'.

Figure 11:
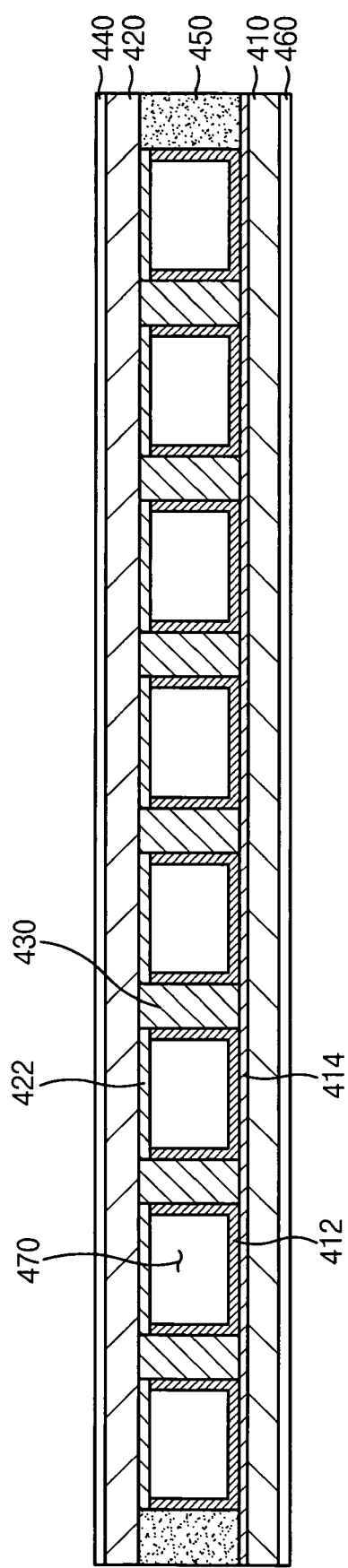
FIG. 11 is a cross-sectional view illustrating the flat fluorescent lamp in FIG. 10.

FIG. 10 is an exploded perspective view illustrating a flat fluorescent lamp according to another exemplary embodiment of the present invention, and FIG. 11 is a cross-sectional view illustrating the flat fluorescent lamp in FIG. 10.

Referring to FIGS. 10 and 11, a flat fluorescent lamp 400 includes a first substrate 410, a second substrate 420, a plurality of partition members 430 and first external electrodes 440. The first and second substrates 410 and 420 have a rectangular plate shape. For example, a glass plate that transmits visible light and blocks ultraviolet light may be employed as the first and second substrates 410 and 420. The first and second substrates 410 and 420 are combined with each other by a sealing member 450. The sealing member 450 is disposed between the first and second substrates 410 and 420. The sealing member 450 is disposed along edge portions of the first and second substrates 410 and 420. Therefore, when the first and second substrates 410 and 420 are combined with each other, an internal space is defined by the sealing member 450 and the first and second substrates 410 and 420.

At least one partition member 430 is disposed in the internal space defined by the sealing member 450 and the first and second substrates 410 and 420 to divide the internal space into discharge spaces 470. When more than one partition member 430 is disposed in the internal space, the partition members 430 are disposed substantially parallel to each other with a substantially same distance between each of the partition members 430. The partition members 430 have a rod shape extended along a longitudinal direction of the flat fluorescent lamp 400. When the first and second substrates 410 and 420 are combined with each other, the partition members 430 make contact with the first and second substrates 410 and 420.

Each partition member 430 has a first width at a first region RE1 of the flat fluorescent lamp 400 that is covered by the first external electrodes 440, and a second width at a second region RE2 of the flat fluorescent lamp 400 that is not covered by the first external electrodes 440. The first width is smaller than the second width. Therefore, a width of a discharge spaces 470 is not uniform over an entire longitudinal length of each of the discharge spaces 470. For example, portions the discharge spaces 470 in the first region RE1 are wider than portions of the discharge spaces 470 in the second region RE2. Therefore, an overlapping area between the first external electrodes 440 and portions of the second substrate 420 that cover the discharge spaces 470 is increased.

Each partition member 430 includes a connection path 480 that connects two neighboring discharge spaces 470. Each partition member 430 may employ a through-hole as the connection path 480. Alternatively, each partition member 430 includes two pieces that are spaced apart from each other, in which a space between the two pieces may be employed as the connection path 480.

Each partition member 430 includes, for example, one connection path 480. When all of the partition members 430 are arranged substantially parallel to each other, the connection paths 480 of the partition members 430 are not arranged along a straight line. The connection paths 480 are disposed, for example, in a zigzag shape.

Discharge gas injected into one of the discharge spaces 470 may move to other discharge spaces 470 through the connection path 480, so that the discharge gas spreads throughout all of the discharge spaces 470. The partition member 430 may include more than one connection path 480.

The first external electrodes 440 are disposed on an outer surface of the second substrate 420. A longitudinal direction of the first external electrodes 440 is substantially perpendicular to a longitudinal direction of the partition members 430. Each first external electrode 440 is disposed over the discharges spaces 470 such that each first external electrode 440 crosses all of the discharge spaces 470. The first external electrodes 440 are disposed at a first end of the second substrate 420, and a second end of the second substrate 420, which is opposite to the first end. The flat fluorescent lamp 400 optionally includes second external electrodes 460 disposed at a position of the first substrate 410, which corresponds to a position of the first external electrodes 440.

The flat fluorescent lamp 400 according to this exemplary embodiment further includes a first fluorescent layer 412, a second fluorescent layer 422 and a light-reflecting layer 414. The first fluorescent layer 412 is disposed at an inner surface of the first substrate 410 and optionally at a side surface of the partition member 430. The second fluorescent layer 422 is disposed at an inner surface of the second substrate 420. Therefore, the first and second fluorescent layers 412 and 422 combine to encase each discharge space 470. The first and second fluorescent layers 412 and 422 transform ultraviolet light generated through plasma discharge into visible light.

The light-reflecting layer 414 is disposed between the first substrate 410 and the first fluorescent layer 412. The light-reflecting layer 414 reflects visible light toward the second substrate 420 to prevent leakage of the visible light.

Figure 12:
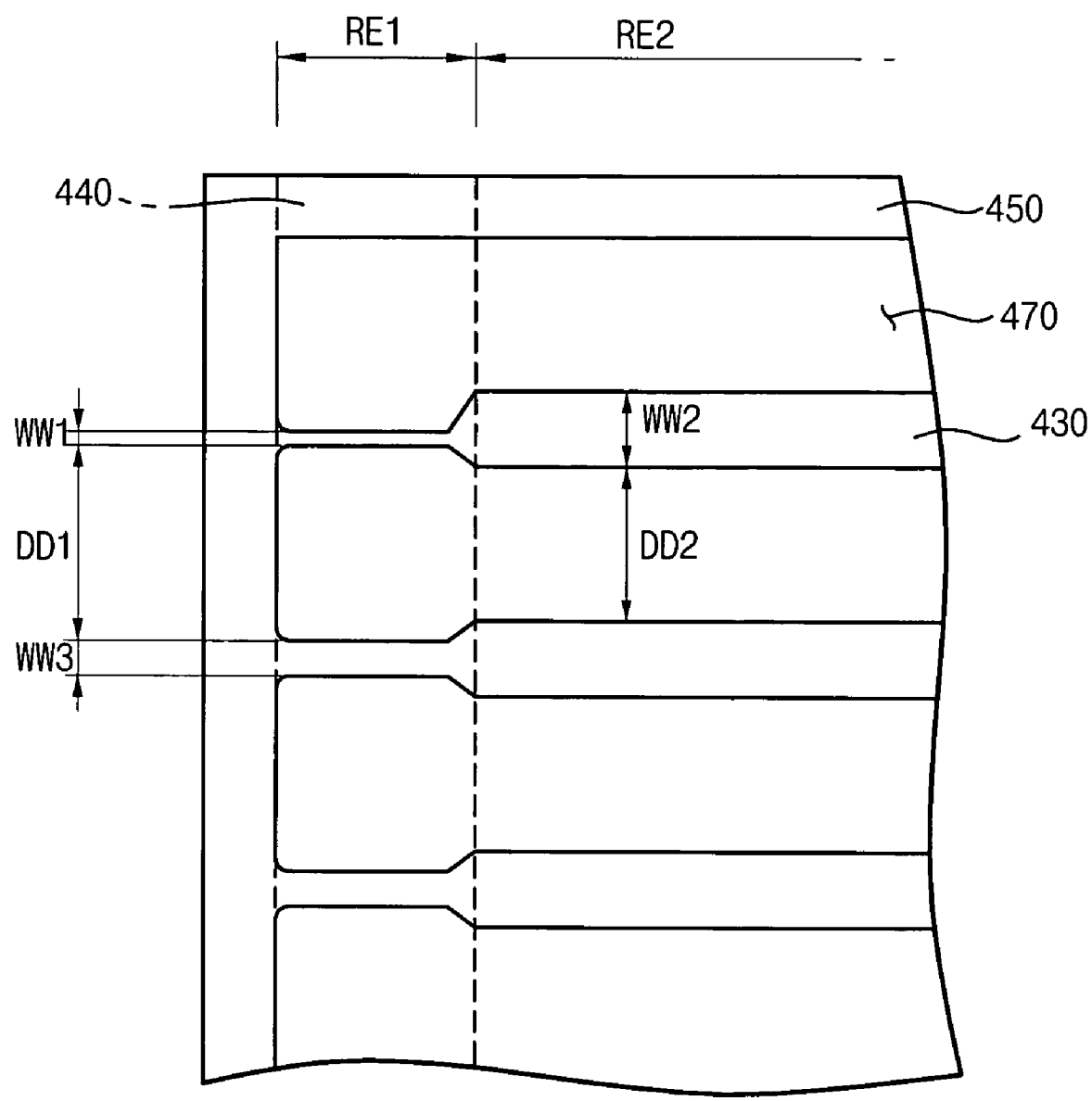
FIG. 12 is a plan view illustrating a structure of a partition member in FIG. 10.

FIG. 12 is a plan view illustrating a structure of a partition member in FIG. 10.

Referring to FIG. 12, each partition member 430 includes portions disposed in the first region RE1 and the second region RE2. At the first region RE1, the first external electrodes 440 overlap the second substrate 420, and at the second region RE2 the first external electrodes 440 do not overlap the second substrate 420. A partition member 430 that is disposed outermost (or the partition member 430 that is closest to an edge portion of the first or second substrate, the edge portion being substantially parallel to the partition member 430) has a first width WW1 at the first region RE1 and a second width WW2 that is greater than the first width WW1 at the second region RE2. The first and second widths WW1 and WW2 represent a width measured along a longitudinal direction of the first external electrodes 440. The partition members 430 except for the partition member 430 that is disposed outermost have a substantially identical shape. For example, the partition members 430 except for the partition member 430 that is disposed outermost have a third width WW3 at the first region RE1 and the second width WW2 at the second region RE2. The third width WW3 is greater than the first width WW1, but smaller than the second width WW2.

A first gap DD1 between two neighboring partition members 430 at the first region RE1 is greater than a second gap DD2 between the two neighboring partition members 430 at the second region RE2. The first and second gaps DD1 and DD2 correspond to widths of the discharge space 470 at the first and second regions RE1 and RE2, respectively. The first and second gaps DD1 and DD2 are fixed so that all discharge spaces 470 has a same width as the first gap DD1 at the first region RE1, and a same width as the second gap DD2 at the second region RE2.

Figure 13:
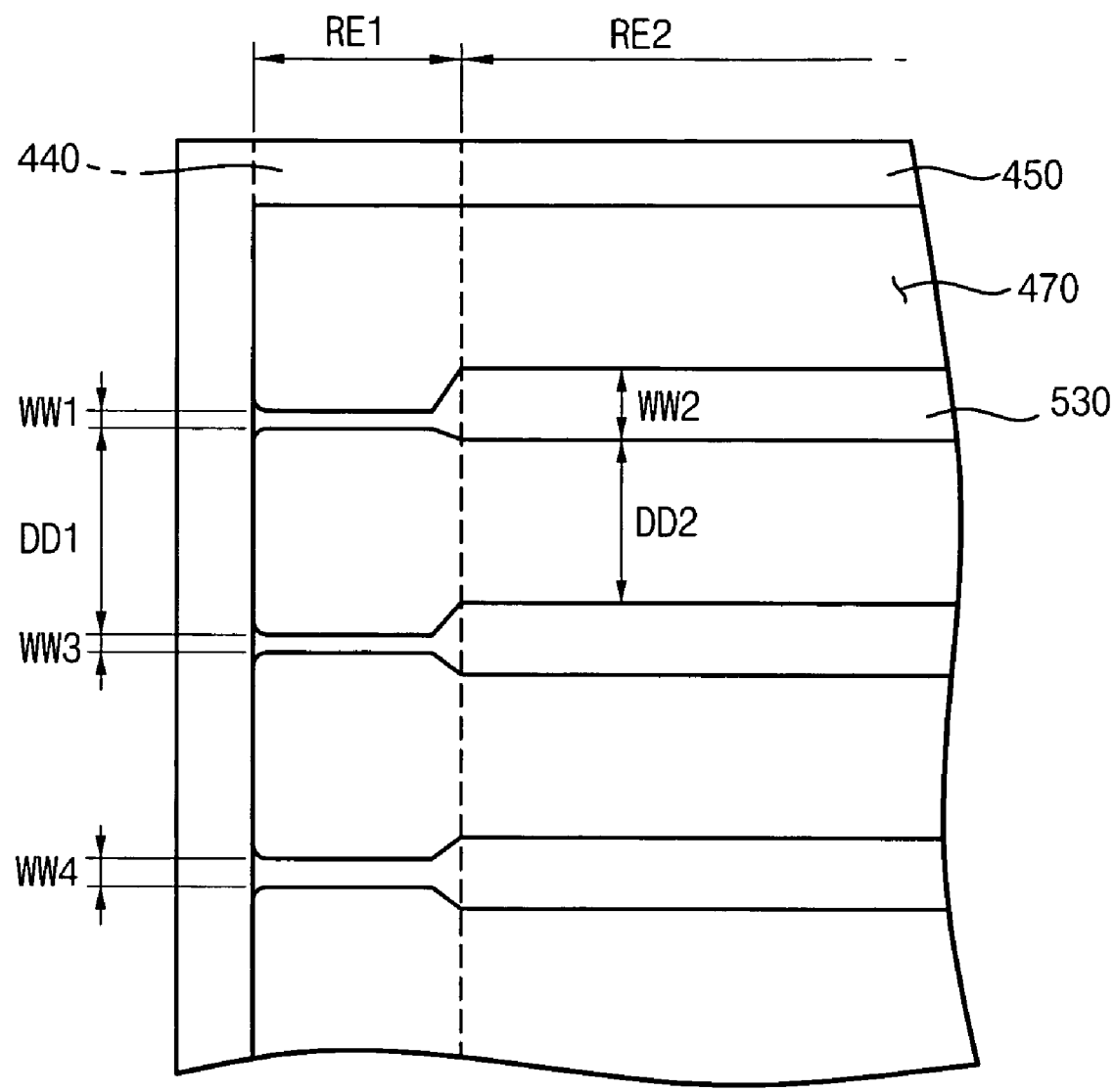
FIG. 13 is a plan view illustrating a flat fluorescent lamp according to yet another exemplary embodiment of the present invention.

FIG. 13 is a plan view illustrating a flat fluorescent lamp according to yet another exemplary embodiment of the present invention. The flat fluorescent lamp of the present embodiment has substantially a same structure as that of the flat fluorescent lamp of the exemplary embodiment of FIG. 12 except for a partition member. Therefore, any further explanation regarding identical elements will be omitted.

Referring to FIG. 13, each partition member 530 has a portion of the partition member 530 disposed at the first region RE1 and a portion of the partition member 530 disposed at the second region RE2. At the first region RE1, the first external electrodes 440 overlap the second substrate 420 and at the second region RE2, the first external electrodes 440 do not overlap the second substrate 420. A partition member 530 that is disposed outermost (or the partition member 530 that is closest to an edge portion of the first or second substrate, the edge portion being substantially parallel to the partition member 530) has a first width WW1 at the first region RE1 and a second width WW2 that is greater than the first width WW1 at the second region RE2. The first and second widths WW1 and WW2 represent a width measured along a longitudinal direction of the first external electrodes 440.

The partition member 530 that is second closest to the edge portion of the first or second substrate has a third width WW3 that is substantially equal to the first width WW1 at the first region RE1 and the second width WW2 at the second region RE2.

The partition members 530 except for the partition members 530 that are closest and second closest to the edge portion of the second substrate 420 have a substantially identical shape. For example, the partition members 530 except for the partition members 530 that are closest and second closest to the edge portion of the second substrate 420 have a fourth width WW4 at the first region RE1 and the second width WW2 at the second region RE2. The fourth width WW4 is greater than the first width WW1 but smaller than the second width WW2.

A first gap DD1 between two neighboring partition members 530 at the first region RE1 is greater than a second gap DD2 between the two neighboring partition members 530 at the second region RE2. The first and second gaps DD1 and DD2 correspond to widths of the discharge spaces 470 at the first and second regions RE1 and RE2, respectively. The first and second gaps DD1 and DD2 are fixed so that all of the discharge spaces 470 have a substantially same width as the first gap DD1 at the first region RE1, and substantially a same width as the second gap DD2 at the second region RE2.

Figure 14:
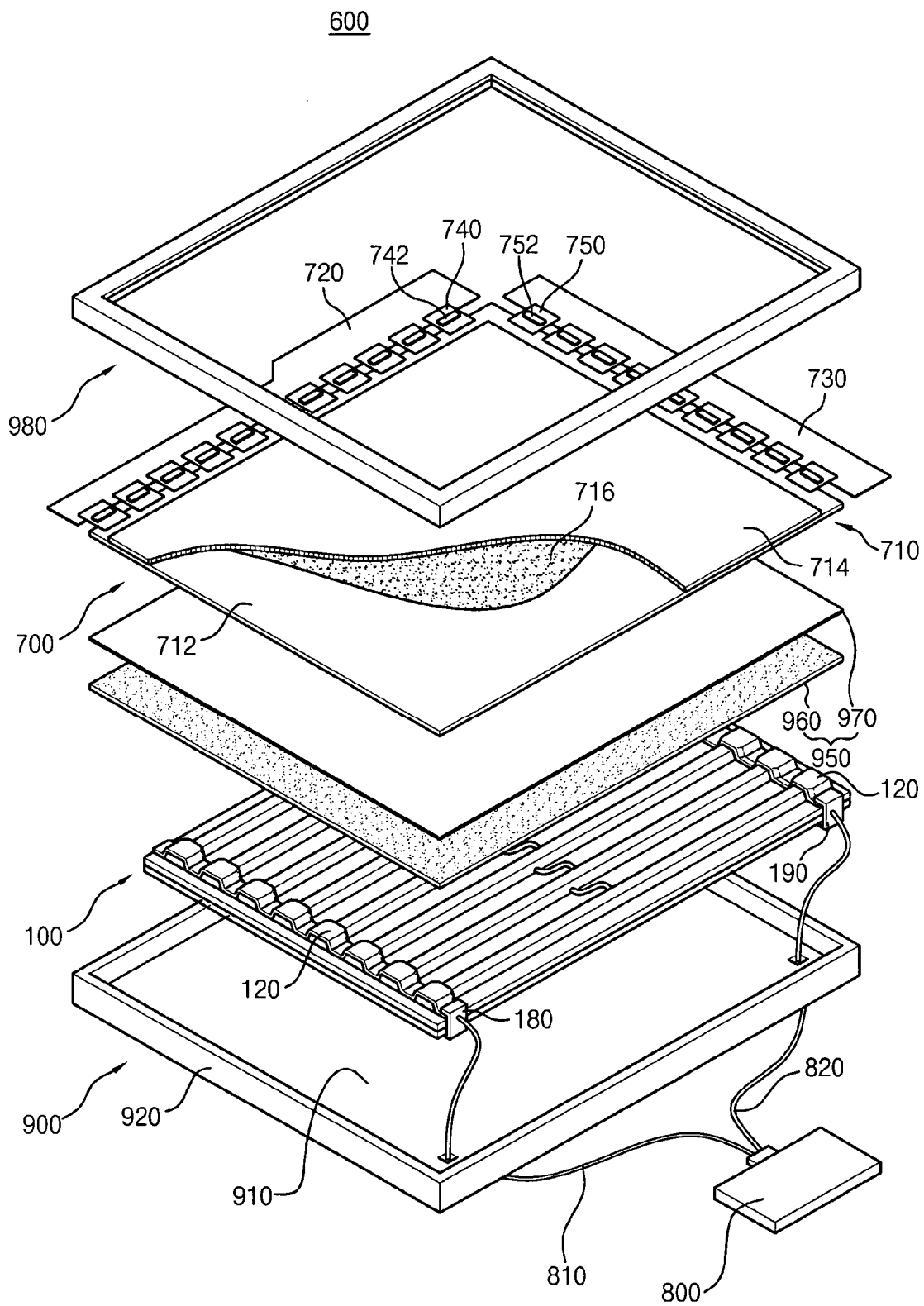
FIG. 14 is an exploded perspective view of an LCD device according to an exemplary embodiment of the present invention.

FIG. 14 is an exploded perspective view illustrating a liquid crystal display device according to an exemplary embodiment of the present invention. In this exemplary embodiment, a flat fluorescent lamp may be one of the exemplary embodiments described above with reference to FIGS. 1-13, therefore, any further explanation will be omitted.

Referring to FIG. 14, a liquid crystal display (LCD) device 600 according to this exemplary embodiment includes the flat fluorescent lamp 100, a display unit 700 and an inverter 800.

The display unit 700 includes an LCD panel 710, a data printed circuit board (PCB) 720 and a gate PCB 730. The LCD panel 710 displays images. The data PCB 720 and the gate PCB 730 provide the LCD panel 710 with driving signals. The driving signals provided by the data PCB 720 and the gate PCB 730 are applied to the LCD panel 710 through a data flexible printed circuit (FPC) 740 and a gate FPC 750. For example, a tape carrier package (TCP), a chip on film (COF), etc. may be employed as the data FPC 740 and the gate FPC 750. The data and gate FPCs 740 and 750 include a data driver chip 742 and a gate driver chip 752, respectively, in order to control timing for applying the driving signals provided by the data and gate PCBs 720 and 730.

The LCD panel 710 includes a thin film transistor (TFT) substrate 712, a color filter substrate 714 that faces the TFT substrate 712 and a liquid crystal layer 716 disposed between the TFT substrate 712 and the color filter substrate 714.

The TFT substrate 712 includes a glass substrate having a plurality of TFTs (not shown) disposed thereon. The TFTs are arranged in a matrix shape. Each TFT includes a gate electrode that is electrically connected to one of gate lines (not shown), a source electrode that is electrically connected to one of source lines (not shown), and a drain electrode (not shown) that is electrically connected to a pixel electrode (not shown). The pixel electrode includes an electrically conductive and optically transparent material.

The color filter substrate 714 includes a glass substrate having red color filters, green color filters and blue color filters. The color filter substrate 714 further includes a common electrode (not shown) having an electrically conductive and optically transparent material.

When a TFT is turned on, electric fields are generated between the pixel electrode and the common electrode to rearrange liquid crystal molecules of the liquid crystal layer 716. When an arrangement of the liquid crystal molecules is changed, an optical transmittance is also changed to display images.

The inverter 800 generates a discharge voltage for driving the flat fluorescent lamp 100. The inverter 800 receives an external alternating voltage and generates the discharge voltage. The discharge voltage is applied to the first external electrodes 120 of the flat fluorescent lamp 100 through a first wire 810 and a second wire 820. When the flat fluorescent lamp 100 includes the second external electrodes 122, the flat fluorescent lamp 100 further includes a first conducting clip 180 and a second conducting clip 190, which are electrically connected to the first and second wires 810 and 820, respectively, and combines the first and second external electrodes 120 and 122.

The LCD device 600 further includes a receiving container 900 that receives the flat fluorescent lamp 100, an optical member 950 for enhancing optical characteristics of light that exits the flat fluorescent lamp 100, and a fixing member 980 that fixes the optical member 950 and the LCD panel 710.

The receiving container 900 includes a bottom plate 910 that supports the flat fluorescent lamp 100, and sidewalls 920 extended from edges of the bottom plate 910 to define a receiving space. The receiving container 900 optionally includes an electrically insulating member (not shown) that electrically insulates the flat fluorescent lamp 100 from the receiving container 900.

The optical member 950 is disposed between the flat fluorescent lamp 100 and the LCD panel 710. The optical member 950 enhances optical characteristics such as frontview luminance, luminance uniformity, etc. The optical member 950 includes a light-diffusing plate 960 having a plate shape. The light-diffusing plate 960 is spaced apart from the flat fluorescent lamp 100. The optical member 950 optionally includes at least one light-condensing sheet 970 disposed on the light-diffusing plate 960. The at least one light-condensing sheet 970 enhances the front-view luminance. The optical member 950 may include a light-diffusing sheet disposed over or under the light-condensing sheet 970 to diffuse light.

The fixing member 980 surrounds edge portions of the LCD panel 710 and combines with the receiving container 900 to fix the LCD panel 710. The fixing member 980 protects the LCD panel 710 and prevents the LCD panel 710 from drifting within the receiving container 900.

The LCD device 600 optionally includes a first frame (not shown) disposed between the flat fluorescent lamp 100 and the light-diffusing plate 960. The first frame surrounds edge portions of the flat fluorescent lamp 100 to fasten the flat fluorescent lamp 100 to the receiving container 900. The first frame also separates the light-diffusing plate 960 from the flat fluorescent lamp 100.

The LCD panel optionally includes a second frame (not shown) disposed between the optical member 950 and the LCD panel 710. The second frame fastens the optical member 950 to the receiving container 900, and guides the LCD panel 710.

According to exemplary embodiments of the present invention, a flat fluorescent lamp and an LCD device having the flat fluorescent lamp in which a n overlapping region between an external electrode and a discharge space increases allows a decreased discharge voltage for a given luminance.

Furthermore, a sealing portion may not be reduced thereby stabilizing a combination between first and second substrates.

Having described exemplary embodiments of the present invention and their advantages, it is noted that various changes, substitutions and alterations can be made herein without departing from the spirit and scope of the invention as defined by appended claims.

What is claimed is:

1. A flat fluorescent lamp comprising:
a lamp body having discharge spaces formed therein; and
first external electrodes disposed at a first end portion of an outer surface of the lamp body and a second end portion that is opposite to the first end portion, the first external electrodes defining a first region where a portion of each of the discharge spaces overlaps the first external electrodes and a second region where remaining portions of the discharge spaces do not overlap the first external electrodes, wherein each of the discharge spaces has a first width at the first region and a second width that is smaller than the first width at the second region.

2. The flat fluorescent lamp of claim 1, wherein the first and second widths correspond to a width measured along a longitudinal direction of the first external electrodes.

3. The flat fluorescent lamp of claim 1, wherein the lamp body comprises:
a first substrate having a plate shape; and
a second substrate including:
discharge space portions spaced apart from the first substrate to define the discharge spaces;
space-dividing portions that make contact with the first substrate, each of the space diving portions being disposed between the discharge space portions to define the discharge space portions; and
a sealing portion corresponding to edge portions of the second substrate, the first and second substrates being combined with each other through the sealing portion.

4. The flat fluorescent lamp of claim 3, wherein the first external electrodes are disposed at an outer surface of the second substrate.

5. The flat fluorescent lamp of claim 4, wherein the first external electrodes include portions protruding away from the first substrate having a width corresponding to the first width at a first end of the first external electrodes and tapering to the second width at a second end of the first external electrodes, the first and second ends being oppositely disposed at transverse ends of the first external electrodes.

6. The flat fluorescent lamp of claim 4, wherein each of the discharge spaces has a width that is gradually changed from the first width to the second width at a boundary region between the first and second regions.

7. The flat fluorescent lamp of claim 4, wherein each of the space-dividing portions has a first space-dividing portion width at the first region, and a second space-dividing portion width that is greater than the first space-dividing portion width at the second region.

8. The flat fluorescent lamp of claim 7, wherein the first and second space-dividing portion widths correspond to gaps between the discharge space portions adjacent to each other.

9. The flat fluorescent lamp of claim 8, wherein all of the first space-dividing portion widths are substantially same.

10. The flat fluorescent lamp of claim 9, wherein each of the discharge space portions has a symmetrical shape with respect to a longitudinal centerline passing through a center of the each of the discharge space portions along a longitudinal direction of the each of the discharge space portions.

11. The flat fluorescent lamp of claim 8, wherein the first space-dividing portion width of the space-dividing portions that are closest to an edge of the second substrate, the edge being substantially parallel to a longitudinal direction of the space-dividing portions, is smaller than the first space-dividing portion width of the space-dividing portions disposed between the space-dividing portions that are closest to the edge of the second substrate.

12. The flat fluorescent lamp of claim 11, wherein the discharge space portions that are closest to the edge of the second substrate have a straight side corresponding to an edge of the sealing portion, the straight side extending through both the first and second regions.

13. The flat fluorescent lamp of claim 12, wherein the space-dividing portions except for the space-dividing portions that are closest to the edge of the second substrate have a symmetrical shape with respect to a longitudinal centerline passing through a center of each of the space-dividing portions along a longitudinal direction of the each of the space-dividing portions.

14. The flat fluorescent lamp of claim 8, wherein the first space-dividing portion width of a first through an n-th set of the space-dividing portions that are n-th closest to an edge of the second substrate, the edge being substantially parallel to a longitudinal direction of the space-dividing portion, is smaller than the first space-dividing portion width of the space-dividing portions disposed between the n-th set of the space-dividing portions, wherein 'n' is a natural number that is one of equal to two and greater than two and "n-th" represents an ordinal number of 'n'.

15. The flat fluorescent lamp of claim 14, wherein the discharge space portion that is closest to the edge of the second substrate has a straight side corresponding to an edge of the sealing portion, the straight side extending through the first and second regions.

16. The flat fluorescent lamp of claim 4, further comprising second external electrodes disposed at a first end portion of an outer surface of the first substrate and a second end portion that is opposite to the first end portion.

17. The flat fluorescent lamp of claim 3, wherein each of the space-dividing portions comprises at least one connection path connecting the discharge space portions with each other, the at least one connection path being defined by a portion of the space-dividing portions that is spaced apart from the first substrate.

18. The flat fluorescent lamp of claim 3, further comprising:
a light-reflecting layer disposed at an inner surface of the first substrate to reflect light toward the second substrate;
a first fluorescent layer disposed at the light-reflecting layer; and
a second fluorescent layer disposed at an inner surface of the second substrate, the first and second fluorescent layers transforming ultraviolet light into visible light.

19. A flat fluorescent lamp comprising:
a first substrate having a plate shape;
a second substrate including discharge space portions spaced apart from the first substrate to define discharge spaces, and space-dividing portions that make contact with the first substrate, each of the space-diving portions being interposed between the discharge space portions to define the discharge space portions; and external electrodes disposed at a first end portion of an outer surface of the second substrate and a second end portion that is opposite to the first end portion, the external electrodes defining a first region where the discharge spaces overlap the external electrodes and a second region where the discharge spaces do not overlap the external electrodes, wherein each of the discharge spaces has a first width at the first region and a second width that is smaller than the first width at the second region.

20. The flat fluorescent lamp of claim 19, wherein a first distance between the discharge spaces at the first region is smaller than a second distance between the discharge spaces at the second region.

21. The flat fluorescent lamp of claim 20, wherein each of the discharge space portions has a symmetrical shape with respect to a longitudinal centerline passing through a center of the each of the discharge space portions along a longitudinal direction of the each of the discharge space portions.

22. The flat fluorescent lamp of claim 20, wherein the first width is about 12 mm and the second width is about 10 mm.

23. The flat fluorescent lamp of claim 20, wherein the first distance is about 2 mm and the second distance is about 4 mm.

24. A flat fluorescent lamp comprising:
a first substrate having a plate shape;
a second substrate having discharge space portions spaced apart from the first substrate to define discharge spaces, space-dividing portions that make contact with the first substrate, each of the space diving portions being disposed between the discharge space portions to define the discharge space portions, and a sealing portion corresponding to edge portions of the second substrate, the first and second substrates being combined with each other through the sealing portion; and
external electrodes disposed at a first end portion of an outer surface of the second substrate and a second end portion that is opposite to the first end portion to define a first region where the discharge spaces overlap the external electrodes and a second region where the discharge spaces do not overlap the external electrodes, wherein each of the discharge spaces has a first width at the first region and a second width that is smaller than the first width at the second region.

25. The flat fluorescent lamp of claim 24, wherein the first width of each of the discharge spaces is substantially same.

26. The flat fluorescent lamp of claim 25, wherein a first space-dividing portion width of portions of the space-dividing portions at the first region is smaller than a second space-dividing portion width of portions of the space-dividing portions at the second region.

27. The flat fluorescent lamp of claim 26, wherein the first space-dividing portion width of the space-dividing portions that are closest to an edge of the second substrate, the edge being substantially parallel to a longitudinal direction of the space-diving portions, is smaller than the first space-dividing portion width of the space-dividing portions disposed between the space-dividing portions that are closest to the edge of the second substrate.

28. The flat fluorescent lamp of claim 27, wherein the second space-dividing portion width of the space-dividing portions is about 4 mm, the first space-dividing portion width of the space-dividing portions that are closest to the edge of the second substrate is about 1 mm, and the first space-dividing portion width of the space-dividing portions that are disposed between the space-dividing portions that are closest to the edge of the second substrate is about 2 mm.

29. The flat fluorescent lamp of claim 26, wherein the space-dividing portion width of a first through an n-th set of the space-dividing portions that are n-th closest to an edge of the second substrate, the edge being substantially parallel to a longitudinal direction of the space-dividing portions, is smaller than the first space-dividing portion width of the space-dividing portions that are disposed between the n-th set of the space-dividing portions, wherein 'n' is a natural number that is one of equal to two and greater than two and "n-th" represents an ordinal number of 'n'.

30. The flat fluorescent lamp of claim 29, wherein the second space-dividing portion width is about 4 mm, the first space-dividing portion width of space-dividing portions closest and second closest to the edge are about 1.5 mm, and the first space-dividing portion widths of remaining space-dividing portions are about 2 mm.

31. A flat fluorescent lamp comprising:
a first substrate having a plate shape;
a second substrate having a substantially identical shape with the first substrate, the second substrate being combined with the first substrate to define an inner space between the first and second substrates;
partition members disposed between the first and second substrates to divide the inner space into discharge spaces; and
external electrodes disposed at a first end portion of an outer surface of at least one of the first and second substrates and a second end portion that is opposite to the first end portion to define a first region where the discharge spaces overlap the external electrodes and a second region where the discharge spaces do not overlap the external electrodes, wherein each of the partition members has a first width at the first region and a second width that is greater than the first width at the second region.

32. The flat fluorescent lamp of claim 31, wherein a first gap between the partition members at the first region is greater than a second gap between the partition members at the second region.

33. The flat fluorescent lamp of claim 32, wherein all first gaps are substantially same in size.

34. The flat fluorescent lamp 33, wherein the first width of partition members that are disposed adjacent to an end portion of the first and second substrates, the end portion being substantially parallel to a longitudinal direction of the partition members, is smaller than the first width of the partition members disposed between the partition members that are adjacent to the end portion.

35. The flat fluorescent lamp 33, wherein the first width of a first through an n-th set of the partition members that are n-th closest to an edge of the first and second substrates, the edge being substantially parallel to a longitudinal direction of the partition members, is smaller than the first width of the partition members disposed between the n-th set of the partition members, wherein 'n' is a natural number that is one of equal to two and greater than two and "n-th" represents an ordinal number of 'n'.

36. A liquid crystal display (LCD) device comprising:
a flat fluorescent lamp including:
a lamp body having discharge spaces formed therein; and
external electrodes disposed at a first end portion of an outer surface of the lamp body and a second end portion that is opposite to the first end portion to define a first region where the discharge spaces overlap the external electrodes and a second region where the discharge spaces do not overlap the external electrodes, wherein each of the discharge spaces has a first width at the first region and a second width that is smaller than the first width at the second region;

a liquid crystal display panel displaying images using light generated by the flat fluorescent lamp; and an inverter applying a discharge voltage to the external electrodes.

37. The LCD device of claim 36, wherein the first and second widths correspond to a width measured along a longitudinal direction of the external electrodes.

38. The LCD device of claim 36, wherein all first widths are substantially same.

39. The LCD device of claim 38, wherein a first gap between portions of the discharge spaces at the first region is smaller than a second gap between portions of the discharge spaces at the second region.

40. The LCD device of claim 39, wherein the first and second gaps correspond to distances between the discharge spaces adjacent to each other at the first and second regions, respectively.

41. The LCD device of claim 40, wherein all first gaps are substantially same.

42. The LCD device of claim 41, wherein each of the discharge spaces has a symmetrical shape with respect to a longitudinal centerline passing through a center of the each of the discharge spaces along a longitudinal direction of the discharge spaces.

43. The LCD device of claim 40, wherein the first width of a first through an n-th set of the discharge spaces that are n-th closest to an edge of the first and second substrates, the edge being substantially parallel to a longitudinal direction of the discharge spaces, is smaller than the first width of the discharge spaces disposed between the n-th set of the discharge spaces, wherein 'n' is a natural number that is one of equal to two and greater than two and "n-th" represents an ordinal number of 'n'.

44. The LCD device of claim 43, wherein each of the discharge spaces except for a discharge space that is closest to the edge of the lamp body have a symmetrical shape with respect to a longitudinal centerline passing through a center of the each of the discharge spaces along a longitudinal direction of the discharge spaces.

45. The LCD device of claim 40, wherein the first width of the discharge spaces that are closest and second and third closest to edges of the lamp body, the edges being substantially parallel to the discharge spaces, is smaller than the first width of the discharge spaces disposed between the discharge spaces that are third closest to the edges.

46. The LCD device of claim 45, wherein the discharge spaces except for the discharge spaces that are closest and second closest to the edges, have a symmetrical shape with respect to a longitudinal centerline passing through a center of each of the discharge spaces along a longitudinal direction of the discharge spaces.

47. The LCD device of claim 36, further comprising:

a receiving container receiving the flat fluorescent lamp;

an optical member disposed between the flat fluorescent lamp and the liquid crystal display panel; and a fixing member configured to fasten the liquid crystal display panel to the receiving container.

48. The LCD device of claim 47, wherein the optical member comprises:

a light-diffusing plate disposed spaced apart from the flat fluorescent lamp, the light-diffusing plate diffusing light generated by the flat fluorescent lamp; and at least one light-condensing s sheet configured to condense light that exits the light-diffusing plate.

* * * * *